(12) United States Patent
Calvignac et al.

(10) Patent No.: US 7,061,860 B1
(45) Date of Patent: *Jun. 13, 2006

(54) NETWORK TRAFFIC SHAPING

(75) Inventors: Jean Calvignac, La Gaude (FR);
Fabrice Verplanken, La Gaude (FR);
Daniel Orsatti, Cagnes Sur Mer (FR)

(73) Assignee: Cisco Technology, Inc., San Jose, CA (US)

( * ) Notice: Subject to any disclaimer, the term of this patent is extended or adjusted under 35 U.S.C. 154(b) by 1083 days.

This patent is subject to a terminal disclaimer.

(21) Appl. No.: 09/706,969

(22) Filed: Nov. 6, 2000

Related U.S. Application Data

(63) Continuation of application No. 08/991,911, filed on Dec. 16, 1997, now Pat. No. 6,144,637.

(30) Foreign Application Priority Data

Dec. 20, 1996 (EP) .................................. 96480121

(51) Int. Cl.
*H04J 3/14* (2006.01)
(52) U.S. Cl. ...................................... 370/229; 370/412
(58) Field of Classification Search ................ 370/229, 370/412, 230, 232, 233, 234, 235, 236, 413, 370/395.1, 468; 375/372
See application file for complete search history.

(56) References Cited

U.S. PATENT DOCUMENTS

| 5,231,633 | A |   | 7/1993  | Hluchyj et al. |
|-----------|---|---|---------|----------------|
| 5,513,224 | A |   | 4/1996  | Holt |
| 5,602,830 | A |   | 2/1997  | Fichou et al. |
| 5,864,540 | A |   | 1/1999  | Bonomi et al. |
| 6,144,637 | A | * | 11/2000 | Calvignac et al. .......... 370/229 |
| 6,175,570 | B1|   | 1/2001  | Cukier et al. |
| 6,320,845 | B1|   | 11/2001 | Davie |

FOREIGN PATENT DOCUMENTS

WO       WO9530318      11/1995

* cited by examiner

*Primary Examiner*—Chi Pham
*Assistant Examiner*—Alexander O. Boakye
(74) *Attorney, Agent, or Firm*—Cesari and McKenna, LLP

(57) ABSTRACT

A method for shaping network traffic in a computer network is described for packet data networks. The method includes one or more packet queues for traffic having a plurality of different desired packet transfer rates, each queue being assigned to a connection having a predetermined desired packet transfer rate. Each incoming data packet is directed to the appropriate queue. Each of a plurality of timing circuits operate at a different frequency in a series of frequencies. The frequencies are selected so that the desired packet transfer rate for a connection can be established by summing outputs from more than one of the timing circuits.

12 Claims, 7 Drawing Sheets

NETWORK TRAFFIC SHAPING

This application is a continuation of application Ser. No. 08/991,911, filed Dec. 16, 1997, now U.S. Pat. No. 6,144,637.

FIELD OF THE INVENTION

The invention relates to data communications and, more particularly, to improvements in traffic shaping apparatus for packet-based data communications networks.

BACKGROUND DESCRIPTION

Modern high speed packet-based data communications networks, such as those employing Asynchronous Transfer Mode (ATM) technology, allow bandwidth to be reserved in advance. This is useful, in particular, for the transport of real time data such as voice or video. In ATM networks the requesting user must call the network control entity to set up a logical connection. Parameters are given in the call set up request which specify the required bandwidth. If all the requested parameters can be granted by the network controller the call is set up, otherwise it is refused.

An important problem in such networks is to ensure that traffic flowing in a particular network connection respects the bandwidth limits which were negotiated for that call at set up time. This is to guarantee that each connection only uses its share of the network resources, thereby minimizing the probability of lost data or other problems resulting from congestion in the network.

Data loss within the network must be avoided not only because missing information can alter the nature of the traffic—for example a missing cell can generate a glitch on a voice connection—but also because data loss can provoke data retransmission by higher level communications protocols thereby increasing the traffic on the connection and worsening network congestion—leading to a higher probability of further data loss.

To ensure that traffic within a connection conforms to its negotiated bandwidth parameters, traffic shaping or scheduling techniques have been developed for use at various points within the network in order to modify the flow of data within a connection to conform to its agreed parameters. Various policing schemes are also used in order to control and, if necessary, penalize traffic in the network by discarding cells from connections which try to exceed their allotted resources.

A wide variety of traffic shaping and policing methods have been proposed and studied. Many of these require a complex computation of an optimized cell transmission schedule. An example of such a technique can be found in EP-A-702472. This optimized transmission schedule must be recalculated if connections are added or deleted. Consequently, these methods are not easy to implement for use at the very high speeds required by modern networks.

SUMMARY OF THE INVENTION

It is an object of the present invention to provide a simple traffic shaping and/or policing technique which can be implemented in hardware at reduced cost.

In brief, this object is achieved by a affic shaping apparatus for packet data communications. The apparatus comprises one or more packet queues for traffic having a plurality of different desired packet transfer rates, one queue being assigned to each desired packet transfer rates. Cell receiving logic is provided to receive incoming packets and to place each incoming data packet in a queue which handles the packet transfer rate for the traffic to which the packet belongs. A plurality of timing circuits are provided, each of which is arranged to operate at a different frequency. The frequencies are selected so that the desired packet transfer rates can be approximated by combining subsets of the available frequencies. The combined outputs of timing circuits in each subset provide packet transfers signals for a particular queue. Cell transmission logic responds to the packet transfer signals to transfer a packet from the corresponding queue to an output.

The invention is particularly, but not exclusively, applicable to ATM networks which employ short fixed length cells and in which traffic is carried over a number of connections each having an associated nominal packet transfer rate. In this environment, the system may have one queue for each connection or, alternatively, one queue corresponding to a group of connections having an associated maximum aggregate packet transfer rate. Incoming packets are received and placed in the queue corresponding to the connection or group of connections to which the packet belongs.

BRIEF DESCRIPTION OF THE DRAWINGS

The foregoing and other objects, aspects and advantages of the invention may be better understood from the following detailed description of a preferred embodiment of the invention with reference to the drawings, in which.

DETAILED DESCRIPTION OF PREFERRED EMBODIMENT OF THE INVENTION

Figure 1:
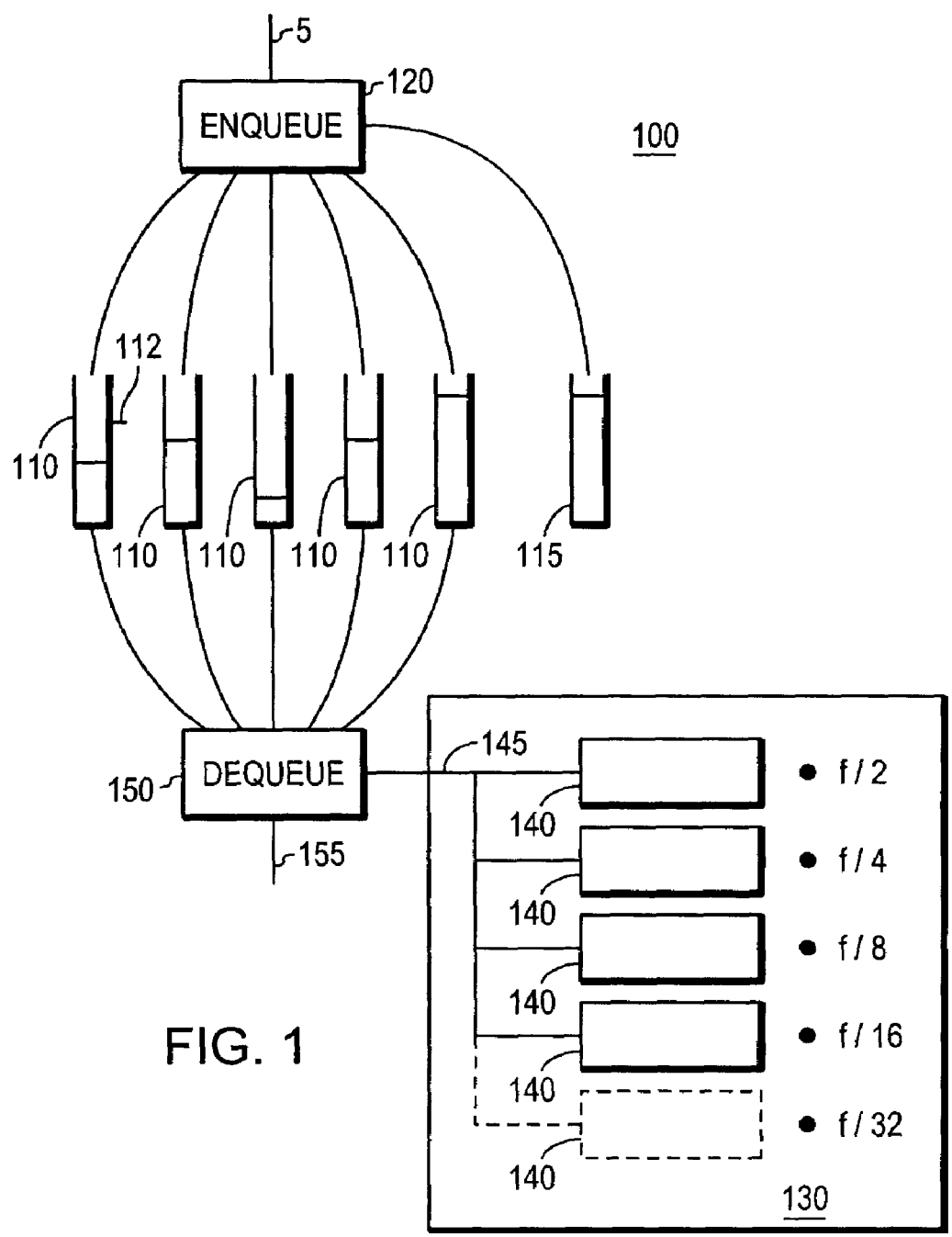
FIG. 1 is a schematic diagram showing traffic shaping apparatus.

FIG. 1 shows in schematic form a traffic shaping device 100 for packet data communications. The apparatus includes a set of cell queues, such as queue 110, which are defined in known fashion using appropriate pointers in a cell buffer memory (not shown). Each queue corresponds either to a particular reserved bandwidth ATM connection having a particular maximum cell transfer rate which was negotiated when the connection was established or to a group of connections for which there is a maximum permitted aggregate bandwidth. Enqueuing logic 120 is provided to receive incoming cells from input 125 and place the incoming data cells in the queue assigned to the connection to which the data cells belong.

Each queue 110 has a threshold 112 which is set according to the maximum Cell Delay Variation (CDV) allowed for the connection. If the queue is filled to the threshold, any further packets arriving for that queue are discarded by sending them to a free queue 115 which holds all the cells not currently in use by the system. This provides a simple policing function to ensure that the negotiated traffic parameters, in particular the CDV, is not exceeded.

A timing unit 130 is provided which includes a plurality of timing circuits 140. For ease of understanding, timing circuits 140 are shown in schematic form only in FIG. 1 and will be described in more detail below. As will be understood from the description which follows, timing circuits 140 need not be physically separate within timing unit 130, but may be implemented using a common counter and control logic.

Timing circuits 140 are each arranged to operate at a different one of a series of frequencies, $F/2^n$ with n=1, 2, 3 .... $n_{max}$, where F is the maximum packet transfer rate. The effective packet transfer rate for each connection is established by combining outputs from the different timing circuits; that is by creating subsets of packet transfer signals at the different frequencies providing by the timing circuits. FIG. 1 shows timing circuits capable of generating packet transfer signals at frequencies F/2, F/4, F/8, F/16, and F/32. Using timing circuits such as those illustrated, any frequency can be approximated to an accuracy of F/32. For example, if a desired cell transfer rate for a particular connection is 15F/32, this can be represented by F/4+F/8+F/16+F/32. In a preferred embodiment, F is 1.5 Mcells/sec which corresponds to a throughput of 636 Mbits/sec for standard fifty-three byte ATM cells.

The timing circuits whose outputs are combined to generate a desired packet transfer rate for a particular queue are arranged as described below to generate packet transfer signals on line 145 for that queue. As an example, if one of queues 110 is assigned to a connection having a negotiated maximum packet transfer rate of 15F/32, then outputs of timing circuits capable of generating packet transfer signals at the respective rates of F/4, F/8, F/16 and F/32 would be combined to established an effective total packet transfer rate of 15F/32 for the connection.

Dequeuing logic 150 is responsive to the packet transfer signals to transfer a packet from its queue to output 155.

Figure 2:
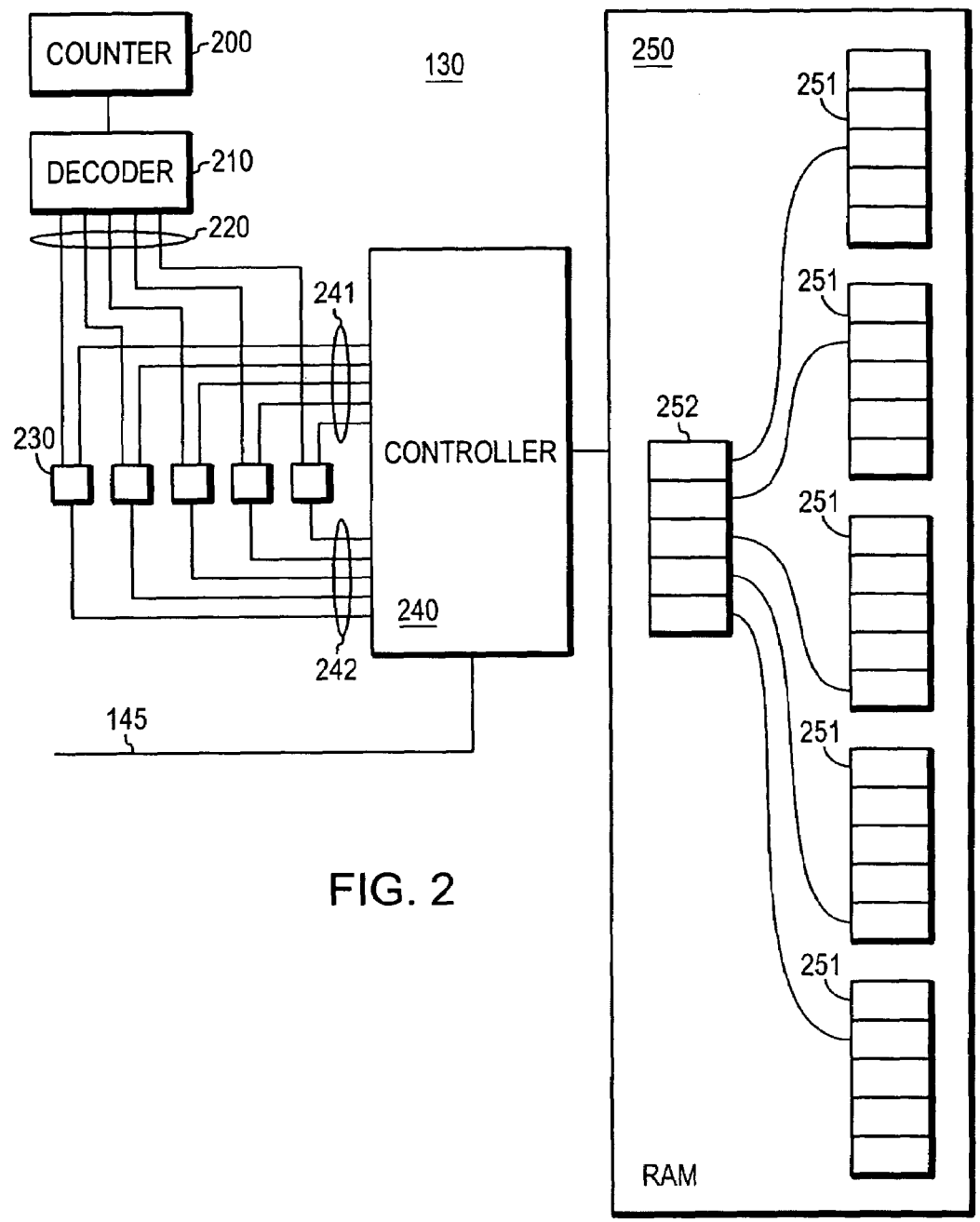
FIG. 2 shows the timing unit of the apparatus of FIG. 1.

FIG. 2 provides more detail about a timing unit 130. The unit 130 comprises a counter 200 which is incremented at frequency F. The count value generated by counter 200 is decoded by decoder 210 to produce activating signals on lines 220 at appropriate times. Each of lines 220 corresponds to a particular frequency in the series $F/2^n$ with n=1, 2, 3 .... $n_{max}$. Only 5 frequencies are shown in FIG. 2, although in practical implementations more frequencies could be used. In a preferred embodiment, a total of 15 different packet transfer frequencies would be generated, which means that any desired packet transfer output can be approximated with a precision of $F/2^{15}$. The activating signals are produced at the start of each period for the particular frequency.

There is a phase difference of half a period between the activating signals for neighboring frequencies in the series, so that, for instance, the activating signal for frequency F/4 occurs in the middle of the period for frequency F/2. This spreads the packet transfer signals for each connection over time and thereby reduces the burstiness of the output traffic for each connection.

Lines 220 are connected to set/reset circuits 230. There is one set/reset circuit 230 for each frequency in the series. The set/reset circuit for each frequency is set at the beginning of the corresponding period by the signals from decoder 210 on lines 220.

Timing unit 130 also includes a memory 250 and a control unit 240, which is linked to each of set/reset circuits 230 via lines 241 and 242.

Each frequency of the series has an associated list of queue IDs, represented at 251 in FIG. 2, stored in memory 250. Also stored in memory 250 is a list 252 of pointers to a current position in each of lists 251. The list of pointers 252 could equally be stored in a suitable register outside memory 250.

A simple mechanism, which for clarity is not shown in FIG. 2, can be used to prevent setting of any set/reset circuit associated with a frequency not currently needed. In a preferred embodiment, this mechanism includes a register which is arranged to keep a record of which frequencies are not currently needed; i.e., which have no queues in their associated list 251. Lines 220 are gated to set/reset circuits 230 under the control of this register. If packet transfer signals at a particular frequency are not needed, as indicated by the absence of a queue identifier in the list 251 associated with the particular frequency, then decoder 210 is not allowed to set the corresponding set/reset circuit 230.

Control unit 240 is arranged to poll, over lines 242, the state of set/reset circuits 230 at frequency F and generate on line 145 a signal identifying a particular cell queue using the lists stored in memory 250. A new cell queue is thus identified at frequency F and consequently the rate at which cells are passed to output 155 from queues 110 is equal to frequency F.

Figure 3:
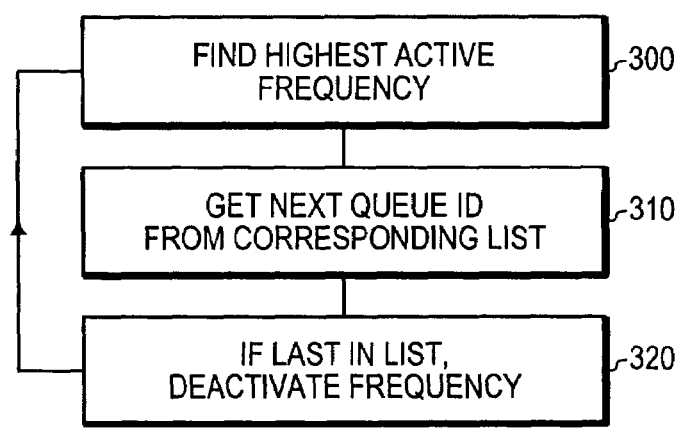
FIG. 3 is a flow diagram illustrating the operation of the timing unit.

This process is illustrated in FIG. 3 in the form of a simple flow diagram. Set/reset circuits 230 are polled in order of decreasing frequency to find the highest frequency for which the respective set/reset circuit is set. This is represented by step 300. For the first set/reset circuit which is set, control unit 240 identifies the current queue ID from a list of queues associated with that frequency and outputs the queue ID on line 145. This is represented by step 310.

If the queue ID is not last in the list, the pointer is incremented to point to the next queue ID in the list and control returns to step 300. If the queue ID is the last in the list, control unit 240 deactivates the set/reset circuit corresponding to that frequency by asserting a reset signal on the appropriate one of lines 241. This is represented by step 320. The pointer to the list 251 for that frequency in the list of pointers 252 is set to point to the first connection ID in the list and control returns to step 300.

Set/Reset circuits 230 are "set" dominant so that if a set signal from decoder 210 occurs at the same time as a reset signal from control unit 240, the set/reset circuit remains in the set state.

The fact that the set/reset circuits are polled in order of decreasing frequency provides a priority control mechanism which ensures that the timing circuits can only generate a packet transfer signal if there is no timing circuit of higher frequency wishing to generate a packet transfer signal at that time. In this way, connections having high data transfer rates are given higher priority since the impact of a given cell delay is a direct function of data transfer rates.

Figure 4A:
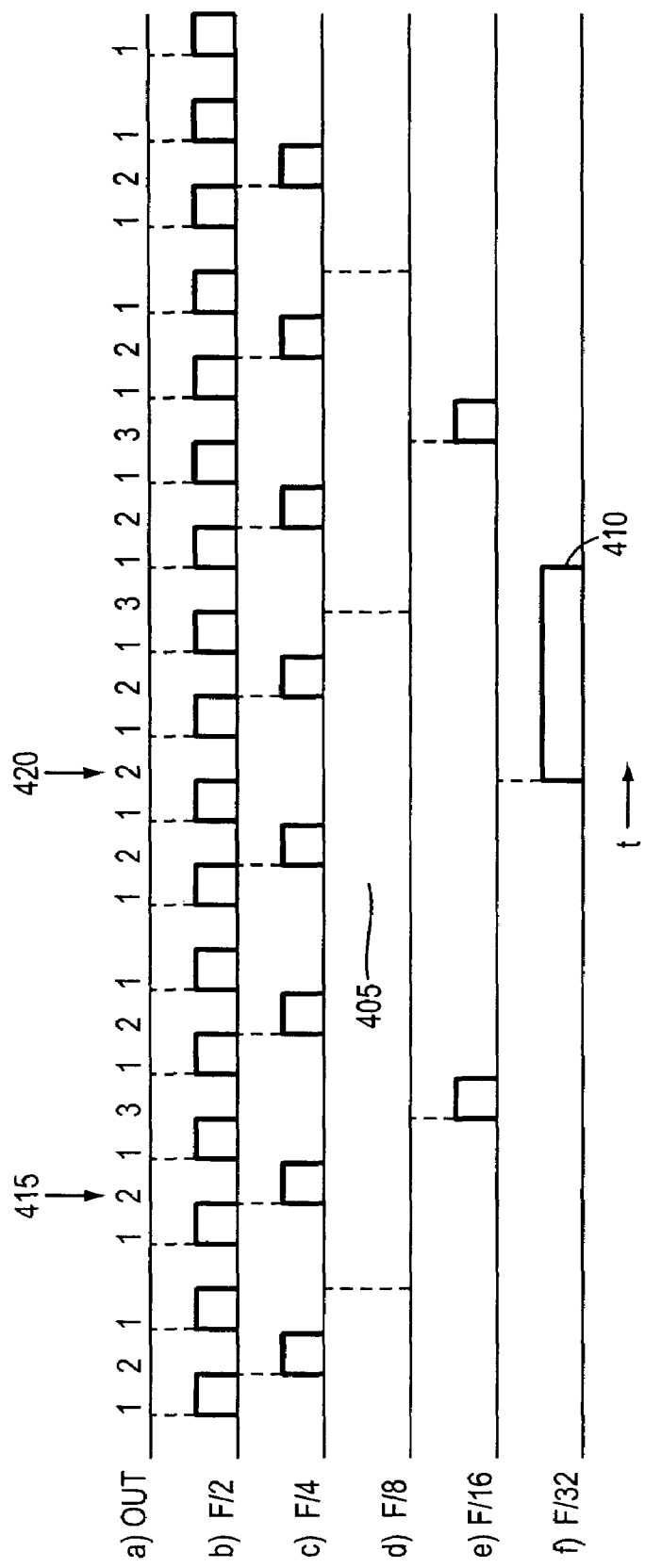
FIGS. 4A, 4B and 4C are timing diagrams illustrating the operation of the timing unit.
Figure 4B:
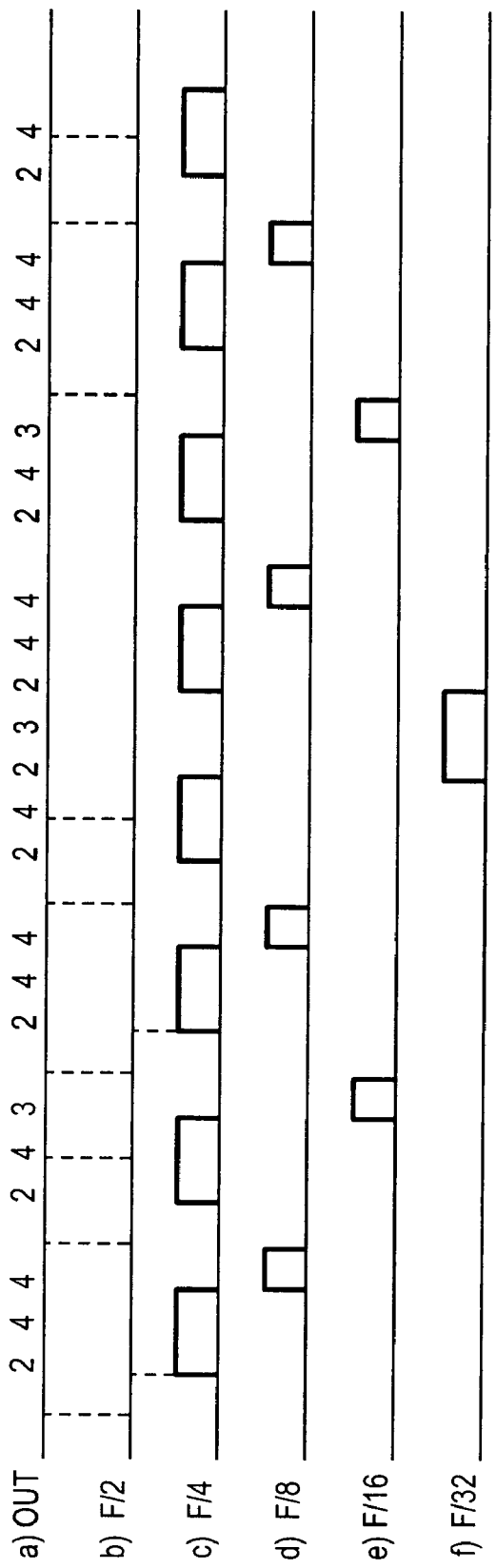
Figure 4C:
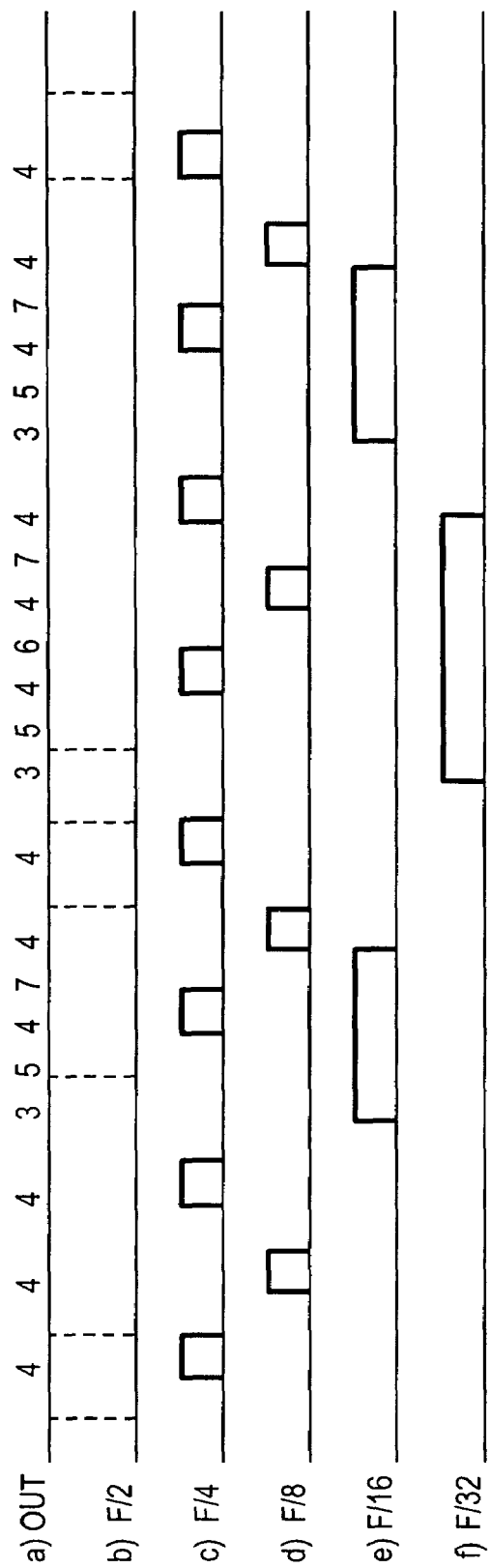

FIGS. 4A, 4B and 4C represent signals generated in applying this process. Dotted vertical lines, such as line 405, indicate the beginning of each time period for each of the different frequencies, illustrating the phase difference introduced between neighboring frequencies in the series. These dotted lines correspond to the signals produced by decoder 210 on the lines 220.

In FIG. 4A, connection identifiers asserted on line 145 at given times are shown in the OUT line at the top of the Figure. The other solid lines of FIG. 4A show the state of the set/reset circuits 230 corresponding to the frequencies listed on the left hand side of FIG. 4A.

In FIG. 4A, the scheduling of three different connections is illustrated. The connections are identified by the connection identifiers 1, 2 and 3 respectively, in the OUT line. Connection 1 requires a packet transfer rate of F/2. Connection 2 requires a packet transfer rate of 9F/32 or F/4+F/32. Connection 3 requires a packet transfer rate of 3F/32 or F/16+F/32. Consequently, the contents of lists 251 would, in this example, be as follows: the list for frequency F/2 would contain connection ID 1; the list for frequency F/4 would contain connection ID 2; the list for frequency F/8 would be empty; the list for frequency F/16 would contain connection ID 3; and the list for frequency F/32 would contain connection IDs 2 and 3.

Once the list of connection IDs for a particular one of the frequencies has been exhausted, the corresponding set/reset circuit 220 is reset via a signal on the appropriate one of lines 241. This is illustrated by the downward edges, such as downward edge 410 in FIGS. 4A–C. It can be seen in FIG. 4A that the set/reset circuit for frequency F/32 remains active for several cycles until the ID for both connections 2 and 3 have been asserted. Only then is the set/reset circuit for frequency F/32 deactivated.

In FIG. 4A it can be observed that, for instance, connection 2 is asserted both when frequency F/4 is the highest active frequency, as illustrated at 415, and also when F/32 is the highest frequency active, as illustrated at 420. This is due to the presence of connection id 2 in the lists 251 corresponding to both these frequencies.

In FIG. 4B, connection 1 has been eliminated and a new connection 4 added with a required packet transfer rate of 12F/32 or F/4+F/8. Consequently, the contents of lists 251 are modified as follows: the list for frequency F/2 is empty, connection 1 having been removed; the list for frequency F/4 contains connection ID 2 and connection ID 4; the list for frequency F/8 contains connection ID 4; the list for frequency F/16 still contains connection ID 3; and the list for frequency F/32 still contains connection IDs 2 and 3.

As before, the connection identifier asserted on line 145 at any particular time is shown in the OUT line of FIG. 4B. The other lines of FIG. 4B show the state of the set/reset circuits 230 corresponding to the frequencies listed on the left hand side of FIG. 4B.

In FIG. 4C, connection 2 has been eliminated and new connections 5, 6 and 7 added. Connections 5 and 7 each have a packet transfer rate of 3F/32 or F/16+F/32. Connection 6 has a desired packet transfer rate of F/32. Consequently, the contents of lists 251 are modified as follows: the list for frequency F/2 is still empty; the list for frequency F/4 contains only connection ID 4; the list for frequency F/8 still contains connection ID 4; the list for frequency F/16 contains connection IDs 3, 5 and 7; and the list for frequency F/32 contains connection IDs 3, 5, 6 and 7.

As before, the connection identifier asserted on line 145 at any particular time is shown in the OUT line of FIG. 4C. The other lines of FIG. 4C show the state of the set/reset circuits 230 corresponding to the frequencies listed on the left hand side of FIG. 4C.

New connections or groups of connections corresponding to queues 110 can be easily added or deleted merely by creating or deleting a corresponding queue 110 and changing the lists 251 so that a packet transfer signal is produced on line 145 at a corresponding rate.

Figure 5:
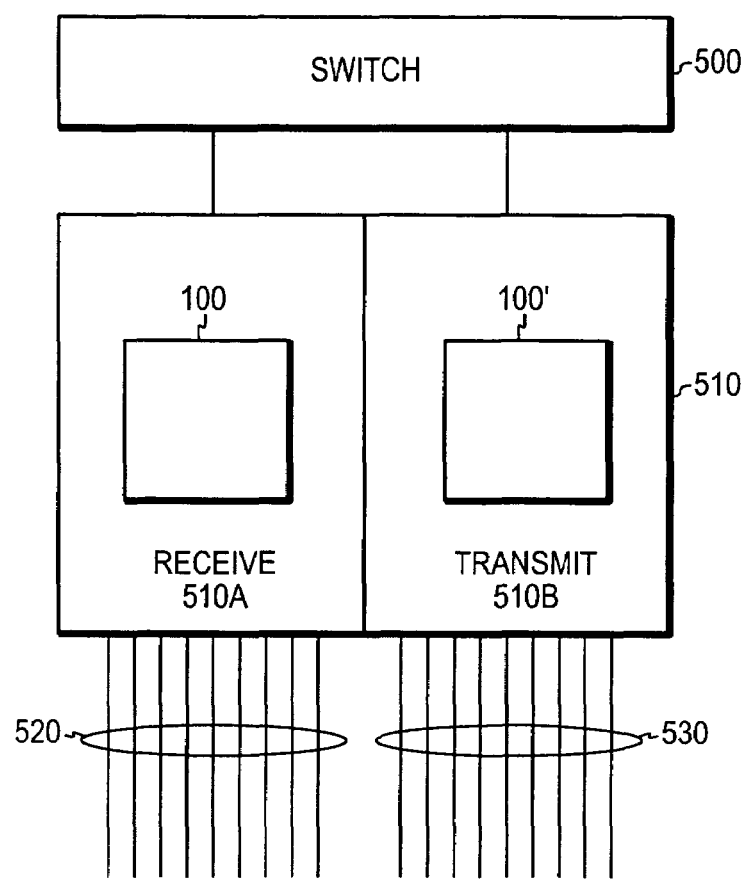
FIG. 5 shows a switching hub including the traffic shaping apparatus of FIG. 1.

FIG. 5 is a schematic diagram showing an ATM switching hub in which such a traffic shaping device is used. The hub comprises a switching fabric 500 and a number of adapters 510 of which only one is shown in FIG. 5. Each adapter 510 is divided into two parts, a receive part 510A and a transmit part 510B. ATM cells are received on inputs 520, multiplexed within the receive part 510A of an adapter and transmitted via switching fabric 500 to the transmit part 510B of one of the adapters, where they are demultiplexed and output on one of output lines 530.

The shaping device 100 is located in the receive part 510A of each adapter and is arranged to shape and police the traffic being passed through switching fabric 500. In the parlance of ATM technology, shaping device 100 in the receive part 510A has the function of UPC (Usage Parameter Control) or NPC (Network Parameter Control).

A similar shaping device, denoted 100' in FIG. 5, can also be located in the transmit part of the adapter for the purposes of output shaping. In this case, each queue would normally represent a number of connections which are destined for transmission over a single ATM connection at, for example, a LAN/WAN interface. For output shaping, the policing function of the shaping device, ie the thresholds 112, is generally not required because such function is normally implemented at the input of a node.

While the invention has been described in terms of preferred embodiments, those skilled in the art will recognize that the invention can be practiced with modifications within the spirit and scope of the appended claims.

Having thus described our invention, what we claim as new and desire to secure by Letters Patent is as follows:

1. A method for traffic shaping for packet data communications comprising:
    establishing one or more packet queues, each queue carrying packet traffic for a particular connection having a desired packet transfer rate;
    directing each incoming packet to the queue assigned to the connection over which the packet is received;
    providing a frequency for packet transfer, the frequency selected from a series of frequencies;
    generating packet transfer rates appropriate for each existing output connection by combining packet transfer frequencies; and
    transferring a packet from an assigned queue in response to combined transfer frequencies.

2. The method of claim 1 wherein said directing step further comprises:
    receiving said packets by receiving logic.

3. The method of claim 1 wherein said providing a frequency step further comprises:
    generating packet transfer signals by a timing logic circuit.

4. The method of claim 1 wherein said transferring a packet step further comprises:
    transferring by cell transfer logic circuits in response to said combined transfer frequencies.

5. The method of claim 1 further comprising:
    diverting a packet from an assigned queue in the event that the assigned queue is filled above a threshold by reception of said packet.

6. The method of claim 1 further comprising:
    inhibiting generation of a packet transfer signal if any higher frequency output is enabled to generate a packet transfer signal.

7. The method of claim 1 further comprising:
    establishing lists of associations between a timing circuit and packet queues, said timing circuit enabled to generate packet transfer signals for any queue on its list.

8. The method of claim 1 further comprising:
    generating a phase difference between an outputs from timing circuits for neighboring frequencies in the series of frequencies.

9. The method of claim 1 further comprising:
generating each frequency of said series of frequencies so that the frequencies are represented by F/v, where F is a maximum packet transfer rate and v is an integer value.

10. A method for operating a switching hub having a switching fabric, at least one input adapter and at least one output adapter, one or more of said input or output adapters including a traffic shaping apparatus, comprising:
providing one or more packet queues, each queue carrying packet traffic for a particular connection having a desired packet transfer rate;
directing each incoming packet to the queue assigned to the connection over which the packet is received;
providing a frequency in a series of frequencies to generate a packet transfer rate;
combining said frequency for a plurality of said queues to generate packet transfer rates appropriate for each existing connection; and
transferring a packet from the assigned queue to a given output connection in response to combined frequencies appropriate to the given output connection.

11. A computer readable media, comprising:
said computer readable media containing instructions for execution on a processor for the practice of the methods of claim 1 or claim 10.

12. Electromagnetic signals propagating over a computer network, comprising:
said electromagnetic signals carrying instructions for execution on a processor for the practice of the methods of claim 1 or claim 10.

* * * * *